United States Patent
Jönsson

(10) Patent No.: US 10,245,662 B2
(45) Date of Patent: Apr. 2, 2019

(54) WALL OR FLOOR SAW

(71) Applicant: HUSQVARNA AB, Huskvarna (SE)

(72) Inventor: Andreas Jönsson, Hallsberg (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/317,312

(22) PCT Filed: Jun. 12, 2014

(86) PCT No.: PCT/SE2014/050709
§ 371 (c)(1),
(2) Date: Dec. 8, 2016

(87) PCT Pub. No.: WO2015/190960
PCT Pub. Date: Dec. 17, 2015

(65) Prior Publication Data
US 2017/0120354 A1 May 4, 2017
US 2017/0361387 A9 Dec. 21, 2017

(51) Int. Cl.
*B28D 1/08* (2006.01)
*B27B 17/08* (2006.01)
(Continued)

(52) U.S. Cl.
CPC .......... *B23D 57/02* (2013.01); *B27B 17/0083* (2013.01); *B27B 17/08* (2013.01); *B28D 1/084* (2013.01); *B28D 1/088* (2013.01)

(58) Field of Classification Search
CPC .......... B28D 1/08; B28D 1/082; B28D 1/084; B28D 1/088; Y10T 83/7101–83/7145;
(Continued)

(56) References Cited

U.S. PATENT DOCUMENTS 2,618,350 A * 11/1952 Von Ruden ......... B27B 17/0091
172/674
2,755,077 A * 7/1956 Proctor .................. E21C 25/26
299/52
(Continued)

FOREIGN PATENT DOCUMENTS

CA      2822290 A1 * 8/2012 ........... B23D 59/008
CN   101171097 A    4/2008
(Continued)

OTHER PUBLICATIONS

International Search Report and Written Opinion for International Application No. PCT/SE2014/050709 dated Feb. 19, 2015, all enclosed pages cited.
(Continued)

*Primary Examiner* — Evan Macfarlane
(74) *Attorney, Agent, or Firm* — Burr Forman McNair

(57) ABSTRACT

The present invention relates to a wall or floor chain sawing device (1), comprising a chain bar assembly (37) which in turn comprises a chain bar (2) having a longitudinal extension (17) and guiding a chain (3) at least partly around its perimeter. The chain bar assembly (37) further comprises a chain bar housing (6) that is attached to, and partially covers, the chain bar (2) and the chain (3). The chain sawing device (1) comprises a motor (9), a track interface (7) that is arranged to co-operate with a guiding track (8), and a power transmission arrangement (10) that is adapted to transfer a motion from said motor (9) to the chain (3). The sawing device (1) comprises a first pivotable support rod (12) and a second pivotable support rod (13), where each pivotable support rod (12, 13) has a corresponding first end (12a, 13a) and a second end (12b, 13b). Each first end (12a, 13a) is at least indirectly pivotably attached to the motor (9), and each
(Continued)

second end (12b, 13b) is at least indirectly pivotably attached to the chain bar assembly (37).

14 Claims, 10 Drawing Sheets

(51) Int. Cl.
   *B23D 57/02* (2006.01)
   *B27B 17/00* (2006.01)
(58) Field of Classification Search
   CPC ......... Y10T 83/68; B27B 17/08; B23D 57/02;
       E21C 25/20; E21C 25/22; E21C 25/24;
       E21C 25/26; E21C 25/28; E21C 25/30;
       E21C 25/32; E21C 25/34; E21C 25/36;
       E21C 25/365; E21C 25/40; E21C 25/50
   USPC ......... 144/376, 377, 378; 125/13.03, 17, 21;
       30/377
   See application file for complete search history.

(56) References Cited

U.S. PATENT DOCUMENTS

| | | | | |
|---|---|---|---|---|
| 3,311,415 | A * | 3/1967 | Miller | B27B 17/14 |
| | | | | 125/21 |
| 3,545,422 | A * | 12/1970 | McNulty | B28D 1/084 |
| | | | | 125/21 |
| 3,965,788 | A * | 6/1976 | Granberg | B23Q 9/0014 |
| | | | | 30/371 |
| 4,181,115 | A * | 1/1980 | Weisner | B23D 59/001 |
| | | | | 125/21 |
| 4,283,980 | A * | 8/1981 | Jackson | B27B 17/0058 |
| | | | | 83/490 |
| 4,300,428 | A * | 11/1981 | Woodland | B23Q 9/0064 |
| | | | | 83/522.19 |
| 4,779,503 | A * | 10/1988 | Mitchell | B27B 17/0058 |
| | | | | 83/381 |
| 4,981,129 | A * | 1/1991 | Osterman | B27B 17/02 |
| | | | | 125/21 |
| 5,078,119 | A * | 1/1992 | Holmes | B23Q 9/0014 |
| | | | | 125/13.01 |
| 5,802,946 | A * | 9/1998 | Leini | A01G 23/091 |
| | | | | 144/34.1 |
| 6,286,905 | B1 * | 9/2001 | Kimura | B23D 57/02 |
| | | | | 125/13.01 |
| 8,413,645 | B2 | 4/2013 | Donnerdal et al. | |
| 2006/0230893 | A1 * | 10/2006 | Brooks | A01G 3/002 |
| | | | | 83/13 |
| 2007/0163412 | A1 | 7/2007 | Baratta et al. | |
| 2007/0234869 | A1 * | 10/2007 | Dale | B27B 17/00 |
| | | | | 83/797 |
| 2012/0180773 | A1 | 7/2012 | Baratta et al. | |
| 2013/0306047 | A1 | 11/2013 | Jonsson | |

FOREIGN PATENT DOCUMENTS

| | | |
|---|---|---|
| WO | 2011014395 A2 | 2/2011 |
| WO | 2012105876 A1 | 8/2012 |

OTHER PUBLICATIONS

International Preliminary Report on Patentability for International Application No. PCT/SE2014/050709 dated Dec. 15, 2016, all enclosed pages cited.

* cited by examiner

WALL OR FLOOR SAW

TECHNICAL FIELD

The present invention relates to a wall or floor chain sawing device that comprises a chain bar assembly which in turn comprises a chain bar having a longitudinal extension and guiding a chain at least partly around its perimeter. The chain bar assembly further comprises a chain bar housing that is attached to, and partially covers, the chain bar and the chain. The chain sawing device comprises a motor, a track interface that is arranged to co-operate with a guiding track, and a power transmission arrangement that is adapted to transfer a motion from said motor to the chain.

BACKGROUND

A wall saw or floor saw is used for cutting openings in either a wall or a floor. While some saws are designed specifically to cut only a wall or a floor, wall saws have a bolt on a guiding track and are designed to cut the structure along the track, i.e. a wall or a floor. In the following, only wall saws will be discussed, although wall saws for cutting floors should also be considered as included in the discussion. A wall saw typically uses a circular cutting blade. Sometimes a concrete chain-saw with a bar and chain is used to cut the opening.

When sawing an opening in a floor or a wall with a wall saw, there is a problem in the corners of the intended opening. Due to the rounded shape of the circular saw blade, all material is not penetrated at the corners and has to be removed afterwards with a concrete chain saw. Alternatively, the saw blade may be moved past the corner, partly outside the border of the opening to remove all material at each corner. This creates a so called overcut which to a degree weakens the structure around the opening.

Examples of previous sawing arrangements are described in US2012/0180773 and US2013/0306047, which are incorporated as reference. In these documents, a chain saw bar is pivotable and arranged to slide in guiding tracks, which is a complicated design that requires a complex control of the feeding motors and it is sensitive to dirt such as concrete dust.

There is thus a need for a wall saw chain sawing device that is less complicated and less sensitive than such saws according to prior art.

SUMMARY

It is an object of the present invention to provide a wall saw or floor saw that is better adapted to handle sawing in corners than those disclosed in the prior art.

This object is obtained by means of a wall or floor chain sawing device that comprises a chain bar assembly which in turn comprises a chain bar having a longitudinal extension and guiding a chain at least partly around its perimeter. The chain bar assembly further comprises a chain bar housing that is attached to, and partially covers, the chain bar and the chain. The chain sawing device comprises a motor, a track interface that is arranged to co-operate with a guiding track, and a power transmission arrangement that is adapted to transfer a motion from said motor to the chain.

That the sawing device furthermore comprises a first pivotable support rod and a second pivotable support rod, where each pivotable support rod has a corresponding first end and second end. Each first end is at least indirectly pivotably attached to the motor, and each second end is at least indirectly pivotably attached to the chain bar assembly.

According to an example, each second end is pivotably attached to a second mounting bracket that is comprised in the chain bar assembly.

According to another example, the chain bar assembly comprises a supporting plate to which the chain bar and the chain bar housing are attached, where the second mounting bracket is releasably mounted to the supporting plate by means of a releasable attachment means that runs in an adjustment slot in the second mounting bracket. When released, at least a part of the attachment means is adapted to travel within the adjustment slot, allowing the longitudinal extension of the chain bar to be adjusted to a desired angle.

According to another example, each first end is pivotably attached to a first mounting bracket. The first mounting bracket may be mounted to a holding frame (that is mounted to the motor. Furthermore, the chain bar assembly may comprise a locking arrangement that is arranged for mounting the first mounting bracket to the holding frame.

According to another example, a support rod plane runs through the pivotable support rods, and a locking plane runs through the locking arrangement. In a second locking position, the locking arrangement is positioned between the pivotable support rods such that the support rod plane and the locking plane coincide.

According to another example, the power transmission arrangement has a first end that is pivotably attached to the motor, and a second end that is pivotably attached to the chain bar. The chain bar is then enabled to perform a circular movement in a cutting plane while maintaining the direction of its longitudinal extension within the cutting plane.

According to another example, the pivotable support rods are formed as handles with a corresponding handle aperture in each pivotable support rod, allowing the chain bar assembly to be carried in any one of the pivotable support rods.

Other examples are disclosed in the dependent claims.

Many advantages are provided by means of the present invention, for example the sawing device:
 is enabled to perform a clear cut in corners, avoiding the disadvantages of prior art; and
 becomes less sensitive to dirt, such as concrete dust.
 Is less complicated.

BRIEF DESCRIPTION OF THE DRAWINGS

In the following, the present invention will be described more in detail, with reference to the appended drawings, where.

DETAILED DESCRIPTION

Figure 1:
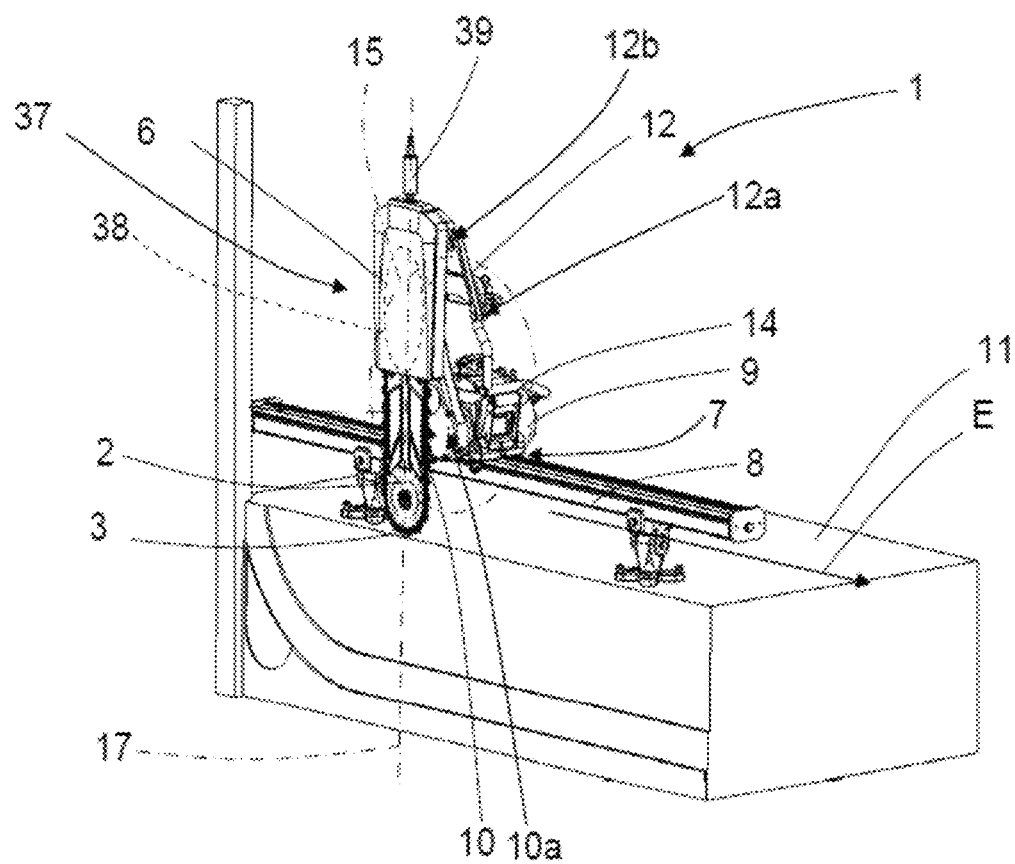
FIG. 1 shows a perspective side view of a wall chain sawing device in a first position.
Figure 2:
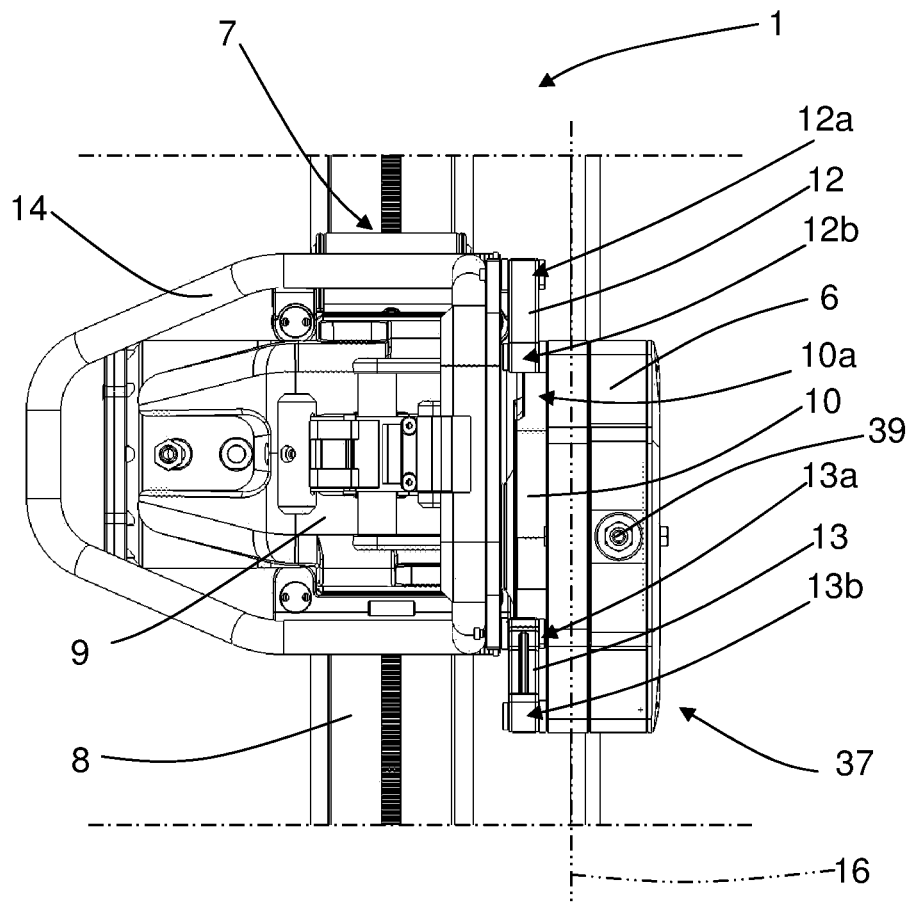
FIG. 2 shows a top view of the wall chain sawing device in a first position.
Figure 3:
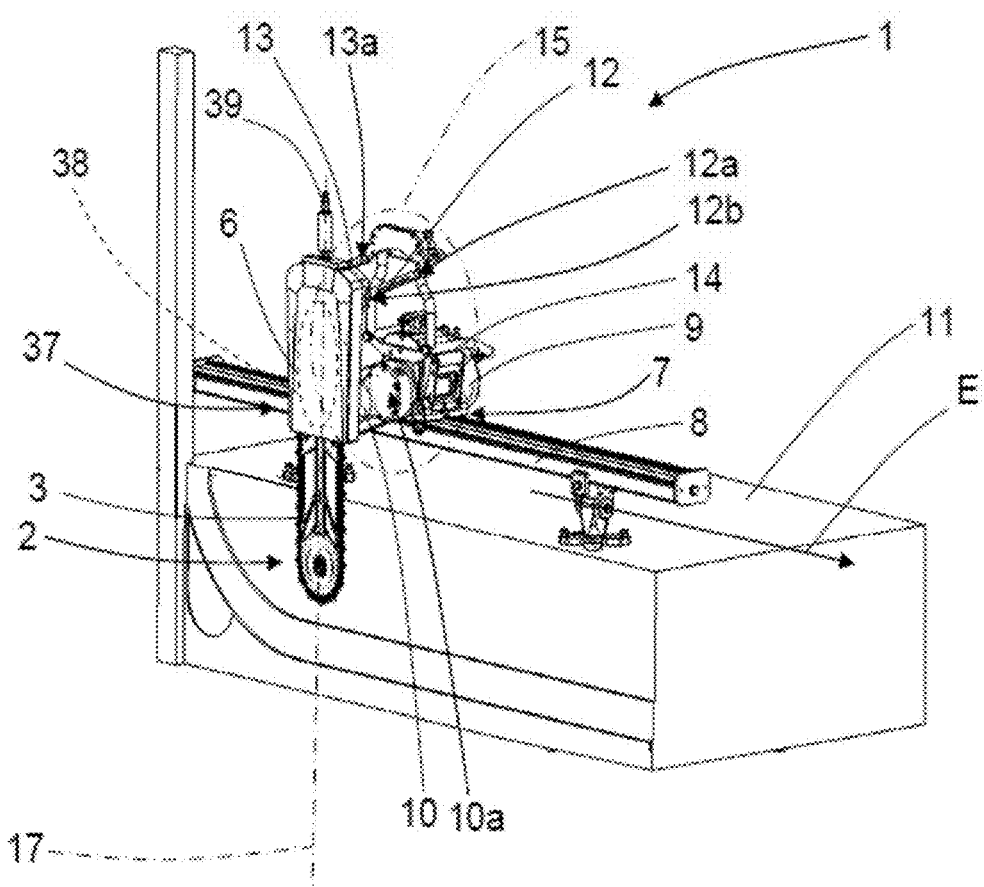
FIG. 3 shows a perspective side view of a wall chain sawing device in a second position.
Figure 4:
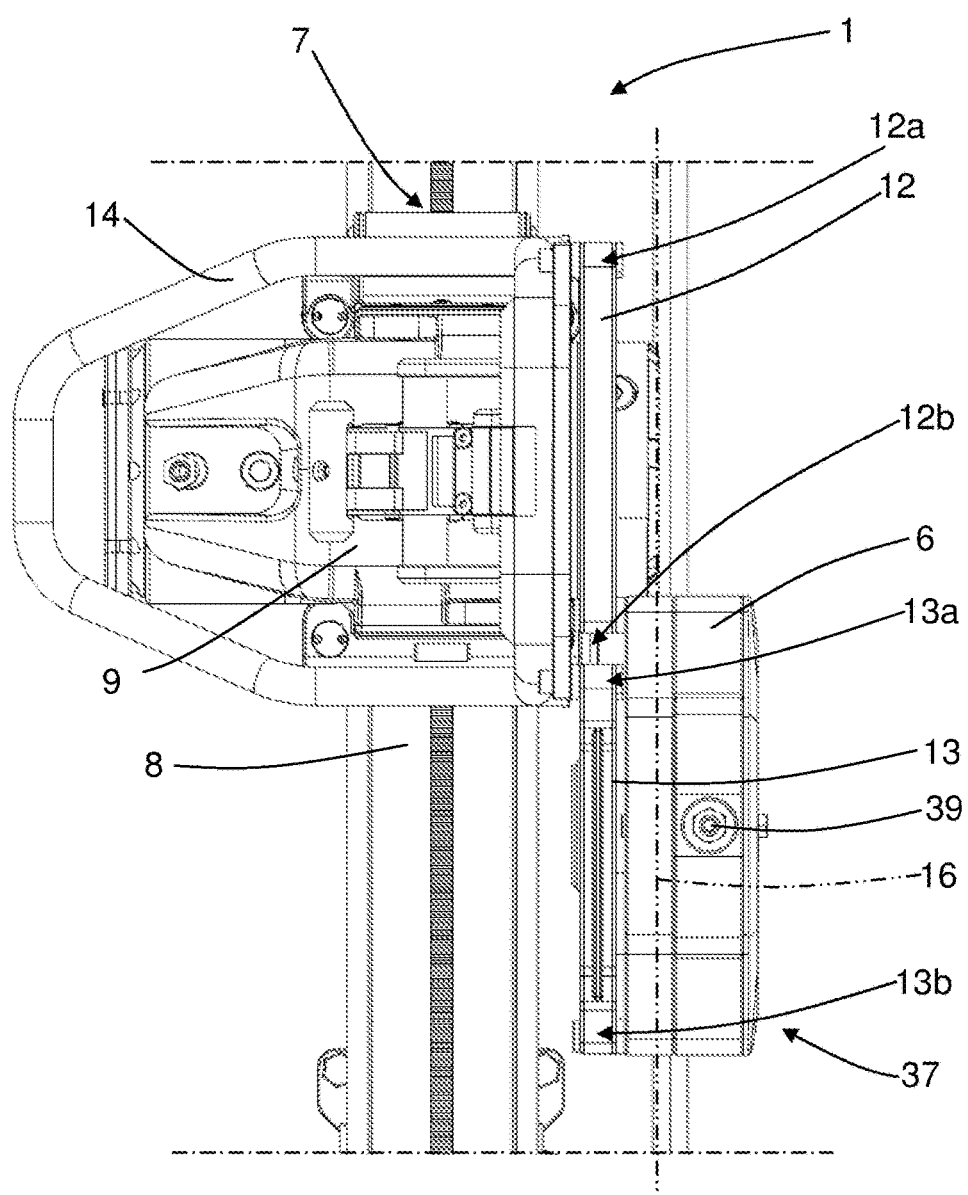
FIG. 4 shows a top view of the wall chain sawing device in a second position.
Figure 5:
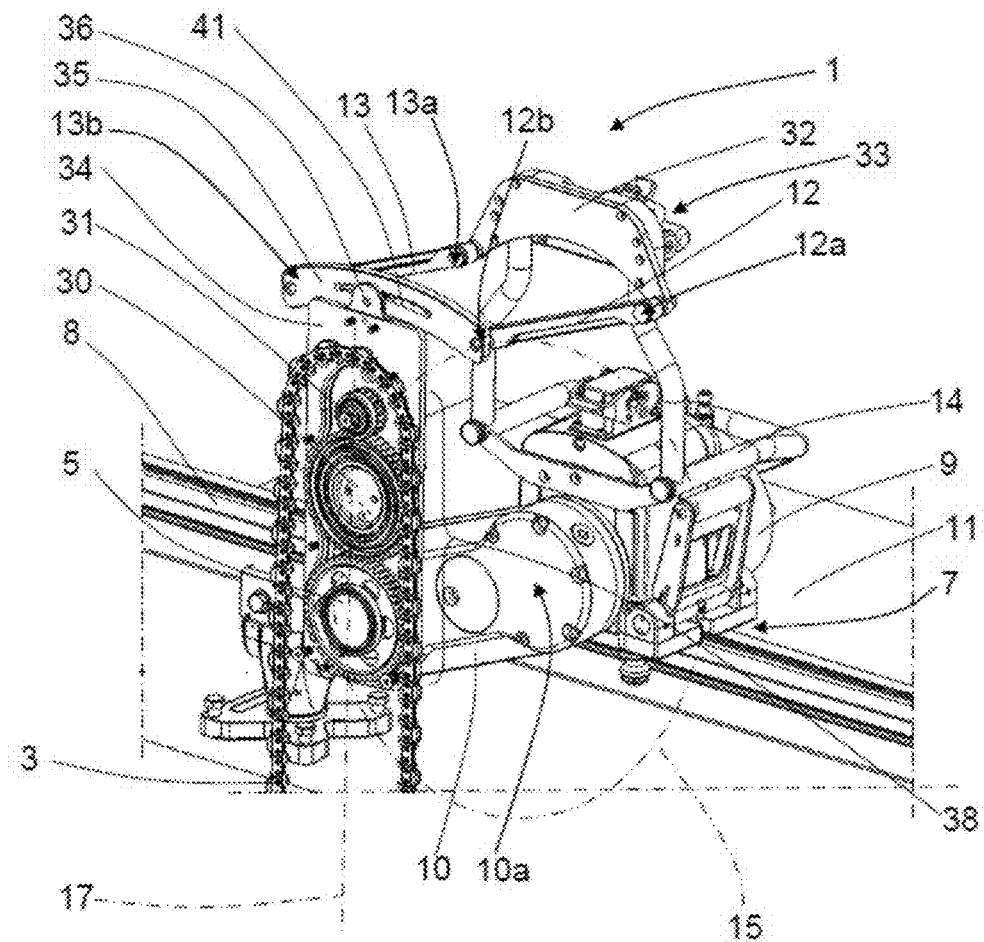
FIG. 5 shows a perspective side view of the wall chain sawing device in the second position, without chain bar and chain bar housing.
Figure 6:
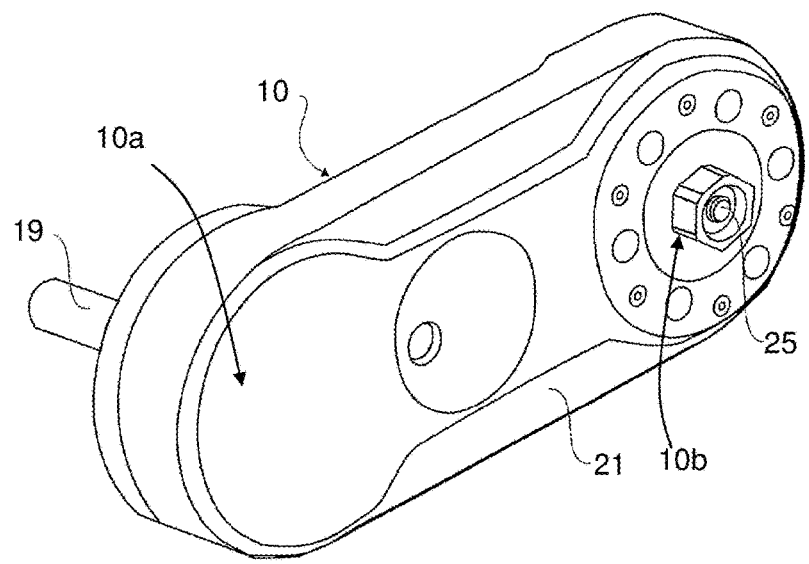
FIG. 6 shows a perspective side view of a power transmission arrangement.

In the following, a wall chain sawing device 1 will be described with reference to FIG. 1, FIG. 2, FIG. 3, FIG. 4 and FIG. 6. FIG. 1 shows a perspective side view and FIG. 2 shows a top view of the wall chain sawing device 1 in a first position. FIG. 3 shows a perspective side view and FIG. 4 shows a top view of the wall chain sawing device 1 in a second position. FIG. 5 shows a perspective side view of the wall chain sawing device 1 in the second position, without chain bar 2 and without chain bar housing 6. FIG. 6 shows a perspective side view of a power transmission arrangement 10.

The wall chain sawing device 1 comprises a chain bar assembly 37 that in turn comprises chain bar 2 that is guiding a chain 3 around its perimeter, where the chain bar 2 has a longitudinal extension 17. The chain bar assembly 37 further comprises a chain bar transmission arrangement 38 that is arranged to propel the chain 3 when running. The chain bar transmission arrangement 38 will be described more later. The chain bar assembly 37 also comprises a chain bar housing 6 that is attached to, and partially covers, the chain bar 2, as well as a water inlet 39 arranged to be connected to a water supply in a previously known manner.

The wall chain sawing device 1 further comprises a track interface 7 that is arranged to co-operate with a guiding track 8, a first motor 9 and a power transmission arrangement 10. The guiding track 8 is releasably attachable to a wall or a floor 11, and has a longitudinal extension E in a direction along which the sawing is made. When sawing, the wall chain sawing device 1 is moved along the guiding track 8 via the track interface 7. The guiding track 8 may be comprised in the chain sawing device 1, so the track interface fixes the device 1 to the track 8. The guiding track may also be a separate part to which the chain sawing device 1 is releasably connected by the track interface.

The wall chain sawing device 1 may be run on the track by means of a separate track motor (not shown) comprised in the track interface 7.

The power transmission arrangement 10 is adapted to transfer motion from said motor 9 to the chain 3 of the chain bar 2 via the chain bar transmission arrangement 38. The power transmission arrangement 10 has a first end 10a that is attached to the motor 9 and a second end 10b that is attached to the chain bar housing 6. Power from the motor 9 is transferred via a gear-train comprised in the power transmission arrangement 10, from the first end part 10a to the second end part 10b, where, at the second end part 10b, power is transferred to the power transfer wheel 5. An example of a gear-train will be described more in detail later.

According to the present invention, the sawing device 1 comprises a first pivotable support rod 12 and a second pivotable support rod 13, where each pivotable support rod 12, 13 has a corresponding first end 12a, 13a and second end 12b, 13b. Each first end 12a, 13a is pivotably attached to a first mounting bracket 32 which in turn is mounted to a holding frame 14 that is mounted to the motor 9, and each second end 12b, 13b is pivotably attached to a second mounting bracket 35 that is comprised in the chain bar assembly 37 as will be described more in detail later. In this example, the pivotable support rods 12, 13 are comprised in the chain bar assembly 37.

The first end 10a of the power transmission arrangement 10 is pivotably attached to the motor 9, and the second end 10b of the power transmission arrangement 10 is pivotably attached to the chain bar housing 6.

By means of this arrangement, the chain bar 2 is enabled to perform a circular movement 15 in a cutting plane 16 while maintaining the direction of its longitudinal extension 17 within said cutting plane 16. The cutting plane 16 in question is the plane where the sawing is performed, and which runs parallel to, and a certain distance from, the guiding track's longitudinal extension E. This is shown in FIG. 1 and FIG. 2, where the wall chain sawing device 1 is in a first position, and in FIG. 3 and FIG. 4, where the wall chain sawing device 1 is in a second position, the chain bar 2 having been moved along the possible circular movement 15 in said cutting plane 16.

By means of arcuate movements along the possible circular movement 15, it becomes possible to position the chain bar 2 at a desired depth, while maintaining the distance from the longitudinal extension E of the guiding track 8 and said cutting plane 16. The sawing device 1 may thus be moved along the guiding track 8, while the chain bar 2 may be positioned at a desired depth. In this way, there is no problem to let the chain bar 2 extend to such a depth that corners are cut in a desired manner, without leaving any un-penetrated material at the corners that otherwise would have to be either removed afterwards manually or by sawing past the corner, outside the border of the opening.

With reference to also to FIG. 6, the power transmission arrangement 10 includes a transmission housing 21. The first end 10a comprises a motor output shaft 19 of the motor 9, and the second end 10b comprises a gear output shaft 25 that is connected to a power transfer wheel 5 comprised in the chain bar transmission arrangement 38 as indicated in FIG. 5. On raising and lowering the chain bar 2, the transmission housing 21 will be turned on a pivotal axis that is coaxial with a rotation axis of the motor output shaft 9, and the second end, will move in an arc according to said circular movement 15.

Figure 7:
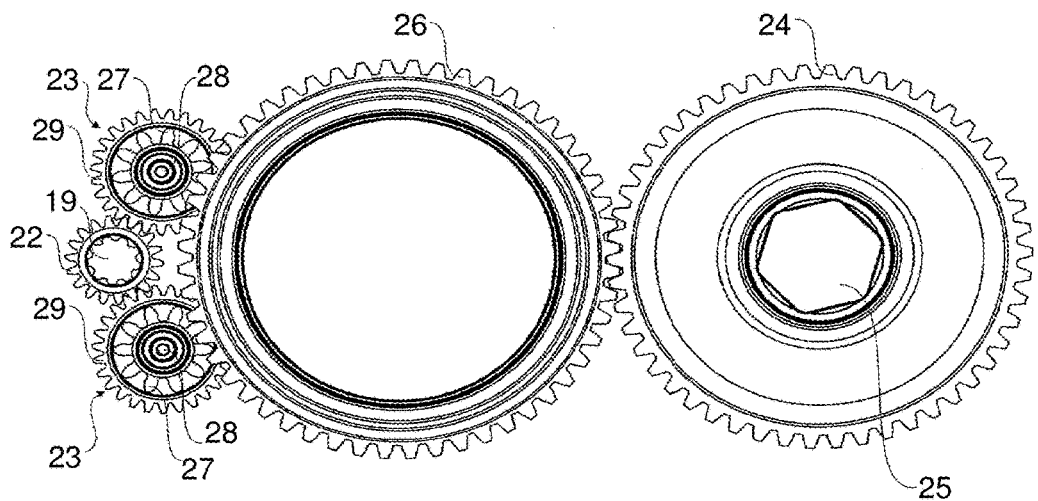
FIG. 7 shows a side view of a gear-train arrangement in the power transmission arrangement.

An example of a transmission gear-train inside the transmission housing 21 is shown in FIG. 7. A first gear 22 is mounted on the motor output shaft 19, which is shown as having a male spline for transferring large forces to a first gear 22 that has a matching female spline. Two first gear assemblies 23 are mounted to be driven in parallel by the first gear 22, and a common second gear 24 is mounted to be driven indirectly by the two first gear assemblies 23 in parallel. The second gear 24 has a gear output shaft 25 on which the chain bar 2 is intended to be mounted.

Although a drive chain might be used for transferring the rotary force to the second gear 24, in this example, a third gear 26 is mounted interposed between the gear assemblies 23 and the second gear 24 to be driven by the gear assemblies 23 and drive the second gear 24. Each first gear assembly 23 comprises a fourth gear 27 integral with a coaxial shaft 28 and constituting a driving gear, and a fifth gear 29 mounted to be able to rotate on the coaxial shaft 28 and constituting a driven gear.

The drive chain may also comprise friction clutches, although not shown in the drawings.

Many other drive chain configurations are of course possible, for example the first gear assemblies 23 may be omitted, the first gear 22 and the third gear 26 then driving the second gear 24 directly.

In the following, an example of the chain bar transmission arrangement 38 will be described. As shown in FIG. 5, the power transfer wheel 5 is connected to an intermediate wheel 30 which in turn is connected to a driving wheel 31. Although not shown in FIG. 5 for the sake of clarity, on the part of the driving wheel 31 that is closest to the chain is connected to a chain driving wheel with teeth that engage the chain 3, the chain bar transmission arrangement 38 comprising the power transfer wheel 5, the intermediate wheel 30, the driving wheel 31 and the chain driving wheel.

This means that when the power transfer wheel 5 is brought into motion, the chain driving wheel transfers a direct driving motion to the chain 3 that is brought to the chain driving wheel via the intermediate wheel 30 and the driving wheel 31. This is a common type of transmission configuration in a chain saw bar 2 of this kind, and only described for improving the general understanding.

According to an example, as shown in FIG. 5, the first mounting bracket 32, to which the pivotable support rods 12, 13 are connected, is releasable from the holding frame 14 by means of a locking arrangement 33. When the locking arrangement 33 is unlocked, the chain bar assembly 37 with the pivotable support rods 12, 13 and the first mounting bracket 32 may be removed from the rest of the wall sawing device 1. The power transfer wheel 5 is then disengaged from the gear output shaft 25.

The locking arrangement may be of any suitable kind, for example in the form of a screw lock, bayonet lock or snap lock.

Figure 8:
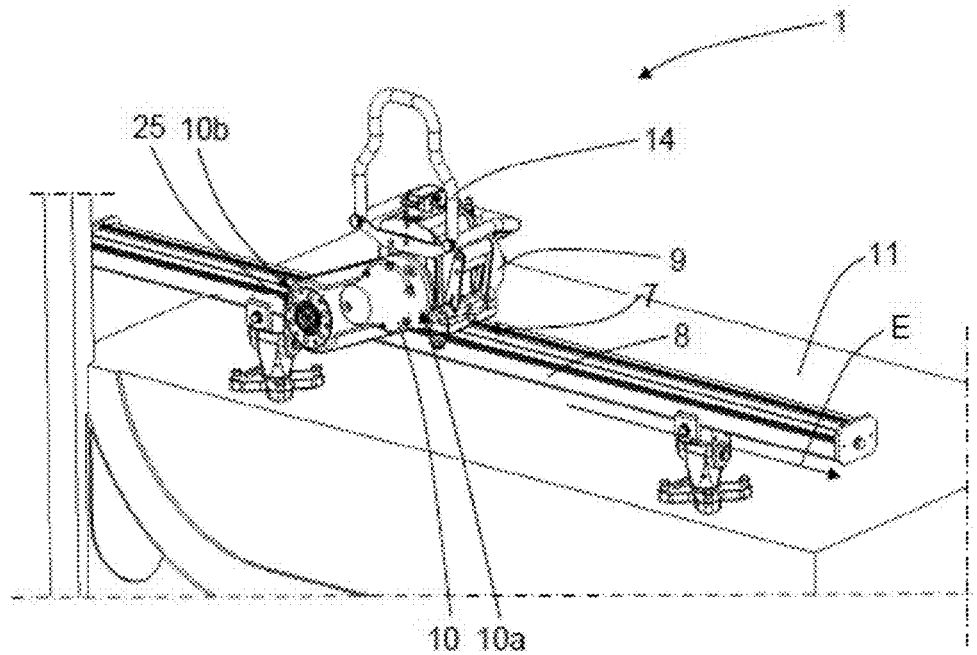
FIG. 8 shows a perspective side view of the wall chain sawing device with the chain bar assembly removed.
Figure 9:
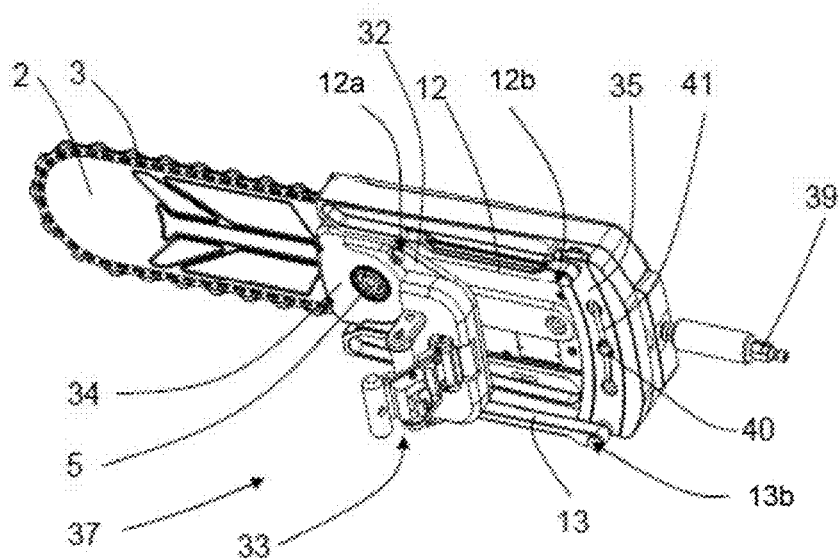
FIG. 9 shows a perspective side view of a chain bar assembly.

The wall sawing device 1 without the chain bar assembly 37 is shown in FIG. 8, and the removed chain bar assembly 37 is shown in FIG. 9.

The purpose of removing the chain bar assembly 37 may be for changing the chain 3 or other service of the chain bar assembly 37. Another purpose may be for changing the chain bar assembly 37 to another sawing tool, such as for example a circular saw assembly with a circular saw blade that may be more suited for cutting longer lengths. This means that a circular saw assembly may be used for regular cutting, and that a chain bar assembly 37 may be used at corners and the like. However, a chain bar assembly 37 may also be used for all cutting.

As shown in FIG. 5, the chain bar assembly 37 comprises a supporting plate 34 to which the transmission arrangement 38, the chain bar 2 and the chain bar housing 6 are attached. The supporting plate 34 and the chain bar housing 6 together cover a part of the chain 3. The second mounting bracket 35 is mounted to the supporting plate 34 by means of a top bolt 36 that runs in an arcuate slot 41 in the second mounting bracket 35. The top bolt 36 is releasably attached to the second mounting bracket 35 by means of for example a nut 40, as shown in FIG. 9, on the other side of the second mounting bracket 35. When the top bolt 36 is released, it may travel within the arcuate slot 41, allowing the longitudinal extension 17 of the chain bar 2 to be adjusted to a desired angle. The arcuate slot 41 does not have to be arcuate, but may have any suitable extension and shape, and is generally constituted by an adjustment slot 41. The top bolt 36 and the nut 40 are generally constituted by any type of suitable attachment means, for example a spring-loaded tension lock.

The present invention is not limited to the above, but may vary freely within the scope of the appended claims. For example, the wall sawing device described above may also be a floor sawing device, as well as a combination thereof.

All details about gear-trains and different kinds of transmission devices are only disclosed as examples; many other types of these are of course conceivable. The motor 9 may for example be an electrical motor, a hydraulic motor, an air power motor or a combustion motor.

The pivotable support rods 12, 13 have been shown to be comprised in the chain bar assembly 37. This is, however, not necessary, for example in a case where the chain bar assembly 37 is attached to the rest of the chain sawing device 1 in a more fixed manner, not being intended to be easily released, and not being intended to be interchangeable.

The pivotable support rods 12, 13 may be pivotably connected directly to the motor, the first mounting bracket 32 and the holding frame 14 not being necessary. In any case, each first end 12a, 13a is at least indirectly pivotably attached to the motor 9. Also, the second mounting bracket 35 is not necessary either, each second end 12b, 13b at least indirectly being pivotably attached to the chain bar assembly 37.

Figure 10:
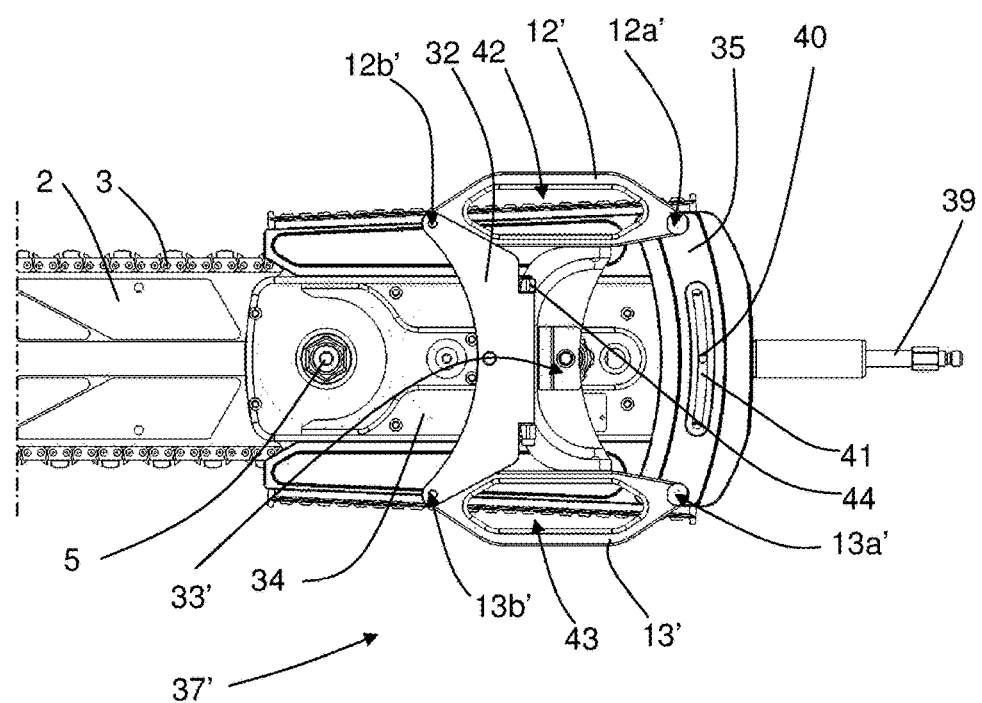
FIG. 10 shows a top view of an alternative chain bar assembly in a first locking position.

With reference to FIG. 10, showing a top view of an alternative chain bar assembly 37' in a first locking position, arranged for carrying the chain bar assembly, the pivotable support rods 12', 13' have a respective first end 12a', 13a' and second end 12b', 13b'. The pivotable support rods 12', 13' are formed as handles with a corresponding handle aperture 42, 43 in each pivotable support rod 12', 13', allowing the chain bar assembly 37' to be easily carried in any one of the pivotable support rods 12', 13' in the first locking position.

Furthermore, here an alternative locking arrangement 33' is pivotable by means of a hinge 44, providing a more compact unit that is easy to handle with decreased risk for injuries due to less protruding parts when the locking arrangement 33' is folded towards the supporting plate 34.

Figure 11:
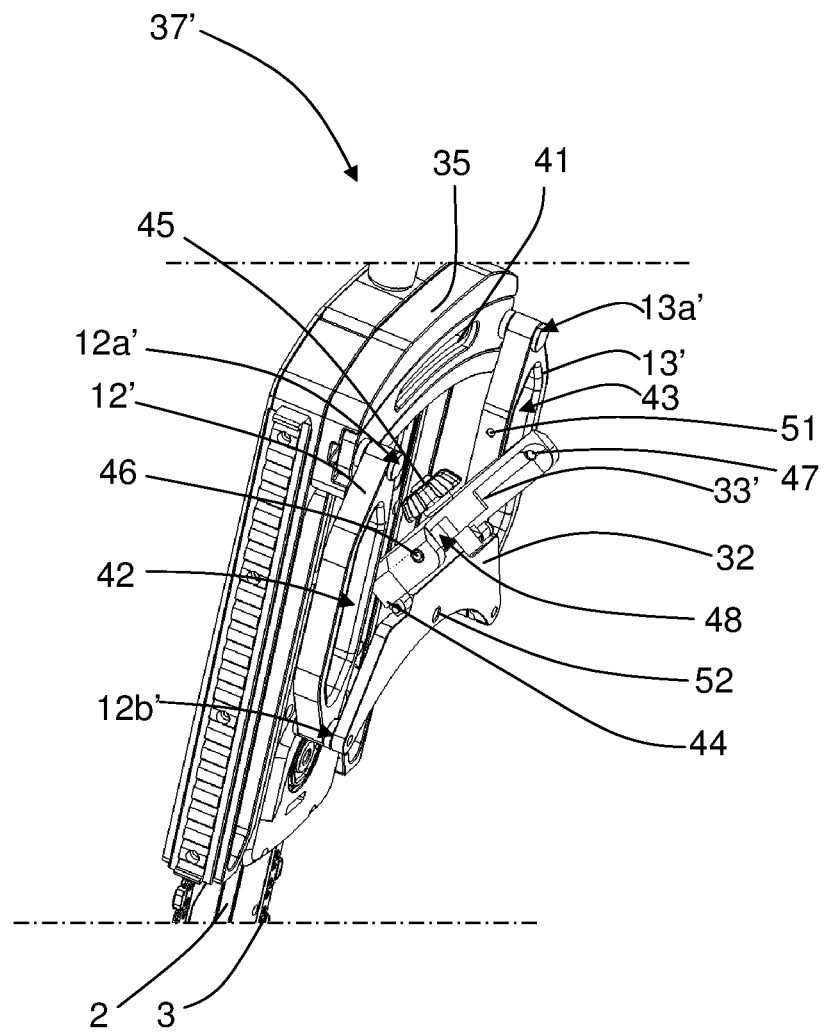
FIG. 11 shows a perspective view of the alternative chain bar assembly in an intermediate position.
Figure 12:
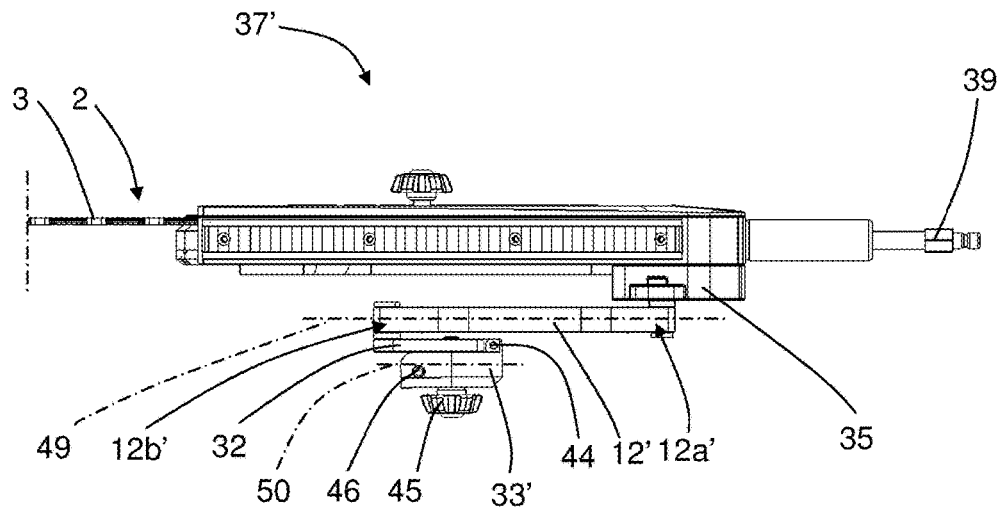
FIG. 12 shows a side view of the alternative chain bar assembly in a second locking position.

The locking arrangement will now be discussed more in detail with reference also to FIG. 11, showing a perspective view of the locking arrangement 33' in an intermediate position; FIG. 12, showing a side view of the locking arrangement 33' in a second locking position where it may be locked to the part with the motor 9; and to FIG. 13, showing a side view of the locking arrangement 33' in the first, carrying, position, corresponding to FIG. 10.

The locking arrangement 33' comprises a screw knob 45, a first spring-loaded locking ball 46 and a second spring-loaded locking ball 47. A part of the holding frame 14, as shown in for example FIG. 5, is arranged to run in a corresponding U-shaped recess 48 in the locking arrangement 33'. Said part of the holding frame 14 may then be attached to the locking arrangement 33' by rotating the screw knob 45 such that a retaining force is provided, the screw knob 45 having a threaded part 45a (shown in FIG. 13) which then engages a correspondingly threaded aperture 52 in the first mounting bracket 32, shown in FIG. 11. This corresponds to the second locking position, as shown in FIG. 12.

With reference to FIG. 12, a support rod plane 49 runs through the pivotable support rods 12', 13', and a locking plane 50 runs through the locking arrangement 33'. In the second locking position as shown in FIG. 12, the support rod plane 49 and the locking plane 50 are running parallel to each other. Generally, in the second locking position, support rod plane 49 and the locking plane 50 are separate from each other.

Figure 13:
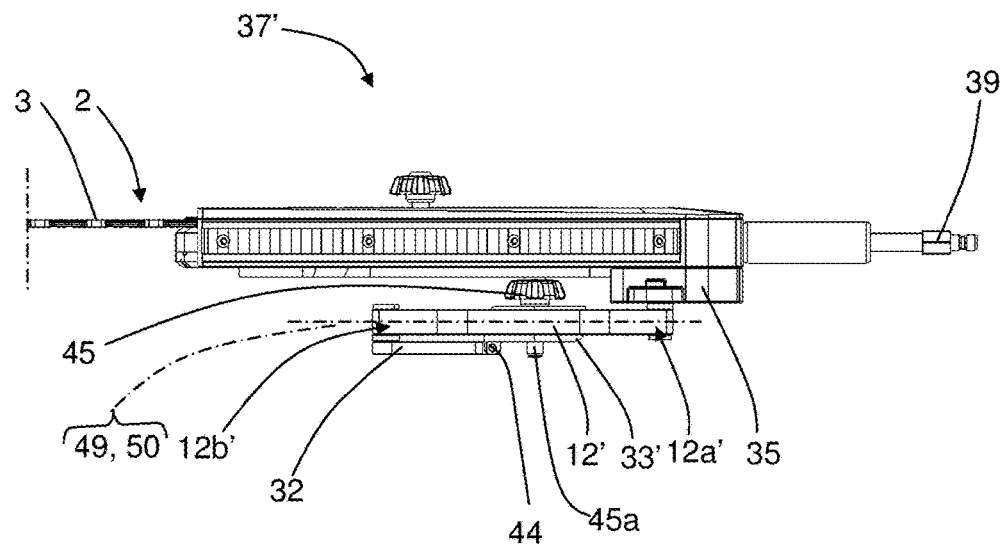
FIG. 13 shows a side view of the alternative chain bar assembly in the first locking position.

In the first locking position, as shown in FIG. 10 and FIG. 13, the locking arrangement 33' is folded such that the locking arrangement 33' is positioned between the pivotable support rods 12', 13', the screw knob 45 faces the chain bar assembly 37' and such that the spring-loaded locking balls 46, 47 are engaging corresponding indents 51 (only one shown in FIG. 11) in the pivotable support rods 12', 13'. Then the first spring-loaded locking ball 46 engages a corresponding first indent in the first pivotable support rod 12', and the second spring-loaded locking ball 47 engages a corresponding second indent 51 in the second pivotable support rod 13'. In the first locking position, the support rod plane 49 and the locking plane 50 coincide. In this manner, the pivotable support rods 12', 13' are held in a firm position, allowing the chain bar assembly 37' to be safely and easily carried.

Above, the alternative locking arrangement 33' disclosed above is described together with the pivotable support rods 12', 13' formed as handles with corresponding handle apertures 42, 43. However, the alternative locking arrangement 33' may be used for any type of pivotable support rods, and the pivotable support rods 12', 13' which are formed as handles with corresponding handle apertures 42, 43 may be used for any type of locking arrangement, the described combination is only an example.

There may be more than the two spring-loaded locking balls 46, 47 described in order to get more positions or a more secure lock in the first locking position.

The spring-loaded locking balls 46, 47 may be comprised in any type of locking arrangement, and is not limited to the one with a screw knob.

The recess 48 may have other shapes than a U-shape.

In general, the present invention relates to a wall or floor chain sawing device 1 that comprises a chain bar assembly 37 which in turn comprises a chain bar 2 that is guiding a chain 3 at least partly around its perimeter, the chain bar 2 having a longitudinal extension 17. The chain bar assembly 37 further comprises a chain bar housing 6 that is attached to, and partially covers, the chain bar 2 and the chain 3. The chain sawing device 1 comprises a motor 9, a track interface 7 that is arranged to co-operate with a guiding track 8, and a power transmission arrangement 10 that is adapted to transfer a motion from said motor 9 to the chain 3.

The sawing device 1 comprises a first pivotable support rod 12 and a second pivotable support rod 13, where each pivotable support rod 12, 13 has a corresponding first end 12a, 13a and second end 12b, 13b. Each first end 12a, 13a is at least indirectly pivotably attached to the motor 9, and each second end 12b, 13b is at least indirectly pivotably attached to the chain bar assembly 37.

The pivotable support rods 12, 13 may have any suitable shapes, such as cylindrical, flat, straight or curved. The pivotable support rods 12, 13 may comprise apertures that function as handles, as described previously.

The pivotable support rods 12, 13 may be directly attached to the motor 9 and the chain bar assembly, or indirectly, for example via a mounting means or similar, such as the mounting brackets described previously.

Preferably, the power transmission arrangement 10 has a first end 10a that is pivotably attached to the motor 9 and a second end 10b that is pivotably attached to the chain bar 2. The chain bar 2 is then enabled to perform a circular movement 15 in a cutting plane 16 while maintaining the direction of its longitudinal extension 17 within the cutting plane 16). However, other arrangements for connecting the power transmission arrangement 10 occur.

The invention claimed is:

1. A wall or floor chain sawing device comprising:
 a chain bar assembly comprising a chain bar guiding a chain at least partly around a perimeter of the chain bar, the chain bar having a longitudinal extension, and a chain bar housing attached to and partially covering the chain bar and the chain;
 a motor;
 a track interface arranged to co-operate with a guiding track;
 a power transmission arrangement adapted to transfer a motion from said motor to the chain; and
 a first pivotable support rod and a second pivotable support rod,
 wherein each of the first pivotable support rod and the second pivotable support rod has a corresponding first end and second end,
 wherein each first end is pivotably attached to a mounting bracket, the mounting bracket being at least indirectly attached to the motor,
 wherein each second end is at least indirectly pivotably attached to the chain bar assembly, and
 wherein the first pivotable support rod and the second pivotable support rod are configured to move the chain bar assembly in a complete circular movement in a cutting plane while maintaining the chain bar assembly in a direction of the longitudinal extension of the chain bar within the cutting plane.

2. The chain sawing device according to claim 1, wherein the power transmission arrangement has a first end that is pivotably attached to the motor and a second end that is pivotably attached to the chain bar, such that the chain bar is enabled to perform the complete circular movement in the cutting plane while maintaining the chain bar in the direction of the longitudinal extension of the chain bar within the cutting plane.

3. The chain sawing device according to claim 2, wherein the first end of the power transmission arrangement comprises a motor output shaft of the motor, and the second end of the power transmission arrangement comprises a gear output shaft that is connected to a power transfer wheel that is comprised in a chain bar transmission arrangement that is arranged to propel the chain.

4. The chain sawing device according to claim 1, wherein the chain bar assembly is releasably attachable to a holding frame and the power transmission arrangement.

5. The chain sawing device according to claim 1, wherein the first pivotable support rod and the second pivotable support rod are formed as handles with a corresponding handle aperture in each of the first pivotable support rod and the second pivotable support rod, allowing the chain bar assembly to be carried in any one of the first pivotable support rod or the second pivotable support rod.

6. A wall or floor chain sawing device comprising:
 a chain bar assembly comprising:
  a chain bar guiding a chain at least partly around a perimeter of the chain bar, the chain bar having a longitudinal extension,
  a chain bar housing attached to and partially covering the chain bar and the chain; and
  a supporting plate to which the chain bar and the chain bar housing are attached;
 a motor;
 a track interface arranged to co-operate with a guiding track;
 a power transmission arrangement adapted to transfer a motion from the motor to the chain; and
 a first pivotable support rod and a second pivotable support rod, wherein each of the first pivotable support rod and the second pivotable support rod has a corresponding first end and second end, wherein each first end is pivotably attached to a first mounting bracket, the first mounting bracket being at least indirectly attached to the motor, wherein each second end is pivotably attached to a second mounting bracket that is comprised in the chain bar assembly, wherein the first pivotable support rod and the second pivotable support rod are configured to move the chain bar assembly in a circular movement in a cutting plane while maintaining the chain bar assembly in a direction of the longitudinal extension of the chain bar within the cutting plane, and wherein the second mounting bracket is releasably mounted to the supporting plate by a releasable attachment means that runs in an adjustment slot in the second mounting bracket, wherein, when released, at least a part of the releasable attachment means is adapted to travel within the adjustment slot, allowing the longitudinal extension of the chain bar to be adjusted to a desired angle.

7. A wall or floor chain sawing device comprising:
a chain bar assembly comprising a chain bar guiding a chain at least partly around a perimeter of the chain bar, the chain bar having a longitudinal extension, and a chain bar housing attached to and partially covering the chain bar and the chain;
a motor;
a track interface arranged to co-operate with a guiding track;
a power transmission arrangement adapted to transfer a motion from said motor to the chain;
a locking arrangement configured to move between a first locking position and a second locking position; and
a first pivotable support rod and a second pivotable support rod,
wherein each of the first pivotable support rod and the second pivotable support rod has a corresponding first end and second end,
wherein each first end is pivotably attached to a mounting bracket, the mounting bracket being mounted to a holding frame via the locking arrangement arranged in the second locking position, the holding frame being mounted to the motor,
wherein each second end is at least indirectly pivotably attached to the chain bar assembly,
wherein the first pivotable support rod and the second pivotable support rod are configured to move the chain bar assembly in a circular movement in a cutting plane while maintaining the chain bar assembly in a direction of the longitudinal extension of the chain bar within the cutting plane,
wherein a support rod plane runs through the first pivotable support rod and the second pivotable support rod and a locking plane runs through the locking arrangement,
wherein, in the second locking position, the locking arrangement is positioned between the first pivotable support rod and the second pivotable support rod such that the support rod plane and the locking plane are separate from each other, and
wherein, in the first locking position, the locking arrangement is positioned between the first pivotable support rod and the second pivotable support rod such that the support rod plane and the locking plane coincide.

8. The chain sawing device according to claim 7, wherein the locking arrangement comprises at least a first spring-loaded locking ball and a second spring-loaded locking ball, wherein, in the first locking position, the first spring-loaded locking ball is arranged to engage a corresponding first indent in the first pivotable support rod, and the second spring-loaded locking ball is arranged to engage a corresponding second indent in the second pivotable support rod.

9. The chain sawing device according to claim 7, wherein the locking arrangement comprises a screw knob, wherein a part of the holding frame is arranged to run in a corresponding recess in the locking arrangement, wherein said part of the holding frame is attachable to the locking arrangement by rotating the screw knob such that a retaining force is provided in the recess in the second locking position.

10. The chain sawing device according to claim 7, wherein the power transmission arrangement has a first end that is pivotably attached to the motor and a second end that is pivotably attached to the chain bar, such that the chain bar is enabled to perform the circular movement in the cutting plane while maintaining the chain bar in the direction of the longitudinal extension of the chain bar within the cutting plane.

11. The chain sawing device according to claim 10, wherein the first end of the power transmission arrangement comprises a motor output shaft of the motor, and the second end of the power transmission arrangement comprises a gear output shaft that is connected to a power transfer wheel that is comprised in a chain bar transmission arrangement that is arranged to propel the chain.

12. A wall or floor chain sawing device comprising:
a chain bar assembly comprising a chain bar guiding a chain at least partly around a perimeter of the chain bar, the chain bar having a longitudinal extension, and a chain bar housing attached to and partially covering the chain bar and the chain;
a motor;
a track interface arranged to co-operate with a guiding track;
a power transmission arrangement adapted to transfer a motion from said motor to the chain, the power transmission including a first end pivotably connected to an output shaft of the motor and a second end pivotably connected to an input shaft of the chain bar housing; and
a first pivotable support rod and a second pivotable support rod,
wherein each of the first pivotable support rod and the second pivotable support rod has a corresponding first end and second end,
wherein each first end of the first pivotable support rod and the second pivotable support rod is pivotably attached to the motor via a first mounting bracket,
wherein each second end of the first pivotable support rod and the second pivotable support rod is pivotably attached to a second mounting bracket that is comprised in the chain bar assembly,
wherein the first end of the power transmission arrangement is configured to rotate about a rotation axis of the output shaft of the motor,
wherein the second end of the power transmission arrangement is configured to move in an arc in a same or parallel plane with a pivotable movement of the first pivotable support rod and the second pivotable support rod, wherein the chain bar assembly comprises a supporting plate to which the chain bar and the chain bar housing are attached, wherein the second mounting bracket is releasably mounted to the supporting plate by a releasable attachment means that runs in an adjustment slot in the second mounting bracket, and wherein, when released, at least a part of the attachment means is adapted to travel within the adjustment slot, allowing the longitudinal extension of the chain bar to be adjusted to a desired angle.

13. The chain sawing device according to claim 12, wherein the chain bar assembly is releasably attachable to a holding frame and the power transmission arrangement.

14. The chain sawing device according to claim 12, wherein the first pivotable support rod and the second pivotable support rod are formed as handles with a corresponding handle aperture in each of the first pivotable support rod and the second pivotable support rod, allowing the chain bar assembly to be carried in any one of the first pivotable support rod or the second pivotable support rod.

\* \* \* \* \*

UNITED STATES PATENT AND TRADEMARK OFFICE
CERTIFICATE OF CORRECTION

PATENT NO. : 10,245,662 B2  
APPLICATION NO. : 15/317312  
DATED : April 2, 2019  
INVENTOR(S) : Andreas Jönsson Page 1 of 1

It is certified that error appears in the above-identified patent and that said Letters Patent is hereby corrected as shown below:

In the Claims

In Column 10, Line 46, in Claim 12, "connected to an input shaft of the chain bar housing;" should read --connected to the chain bar housing;--.

Signed and Sealed this  
First Day of October, 2019

Andrei Iancu  
*Director of the United States Patent and Trademark Office*